July 2, 1940. T. KÜMMICH 2,206,409

CHANGE-SPEED GEAR, ESPECIALLY FOR MOTOR VEHICLES

Filed March 18, 1938

INVENTOR:

Patented July 2, 1940

2,206,409

UNITED STATES PATENT OFFICE 2,206,409

CHANGE-SPEED GEAR, ESPECIALLY FOR MOTOR VEHICLES

Theodor Kümmich, Stuttgart, Germany, assignor to Daimler-Benz Aktiengesellschaft, Stuttgart-Unterturkheim, Germany Application March 18, 1938, Serial No. 196,665
In Germany March 18, 1937

6 Claims. (Cl. 74—359)

This invention relates to a change-speed gear especially for motor vehicles, with a change clutch shiftable in both directions out of its neutral position for alternately changing two speeds, and it consists substantially in that the change clutch is constructed at the same time as a gear wheel with which, when the change clutch is in its neutral position another gear wheel can be brought into mesh especially for obtaining a reverse speed.

The invention also relates to a change-speed gear, especially for motor vehicles, with an outer clutch member shiftable for changing one or two speeds, slidably mounted on an inner clutch member constructed for example as a synchronizing device and connected with the outer clutch member for example by an arrangement, automatically disengageable under increased changing pressure, the invention being characterized substantially in that the outer clutch member shiftably mounted on the inner clutch member is constructed at the same time as a gear wheel for obtaining another speed, especially a reverse speed.

As compared with the known gears the gear according to the invention is much shorter and simpler, as by constructing the clutch member as a gear wheel, an additional space for this wheel is saved. At the same time the gear is more silent owing to the shortening of its shafts and distances between bearings. Moreover, the invention enables an additional speed to be incorporated in the gear without adding to the length.

The clutch member provided with the toothed rim preferably serves as gear wheel for the reverse speed, as the toothed portion can, in this case, be provided with straight teeth without any disadvantages resulting therefrom, whereas the gear wheels for the forward speeds are preferably formed by pairs of biased permanently meshing gear wheels and cooperating for example with synchronizing devices. Furthermore the arrangement in combination with the reverse speed is particularly advantageous as far as a slide wheel is not necessary either on the main shaft or on the countershaft for the engagement of the reverse speed which can be effected by shifting the usual third wheel.

An embodiment of the invention is illustrated by way of example in the accompanying drawing, in which.

Figure 1:
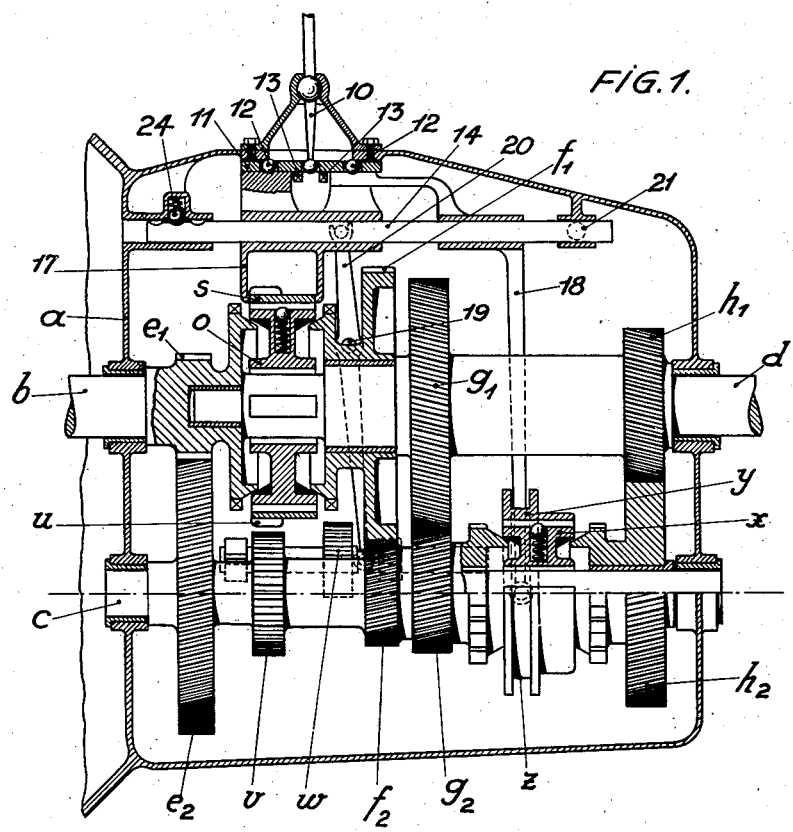
Fig. 1 shows the gear in longitudinal section.
Figure 2:
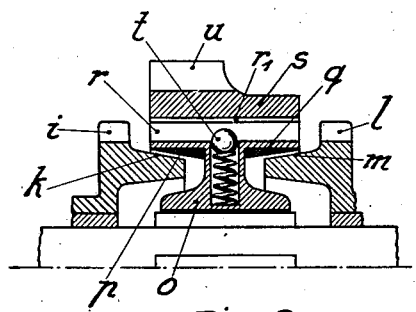
Fig. 2 shows a detail of Fig. 1 on an enlarged scale.

The driving shaft $b$ is journalled in a case $a$ which accommodates the countershaft $c$ and the driven main shaft $d$. The two first mentioned shafts are permanently connected by the two gear wheels $e_1$, $e_2$ with biased teeth, whereas three pairs of permanently meshing biased toothed gear wheels $f_1$, $f_2$, $g_1$, $g_2$ and $h_1$, $h_2$ are provided between the driven main shaft $d$ and the counter-shaft $c$, the gear wheel $f_1$ being loosely rotatable on the main shaft and the gear wheels $g_2$ and $h_2$ loosely rotatable on the counter-shaft, whereas the other gear wheels are keyed on their shafts.

A rim of claws $i$ and a cone $k$ are rigidly connected with the shaft $b$ and the gear wheel $e_1$, and a rim of teeth $l$ and a cone $m$ with the gear wheel $f_1$. Between the two gear wheels an inner change clutch member $o$ is splined on the main shaft $d$ and provided with conical faces $p$ and $q$ and equipped with outwardly directed keys $r$. On these keys a second outer change clutch member $s$ with inwardly directed keys $r_1$ is mounted and coupled with the inner change clutch member $o$ by a ball $t$ engaging under spring pressure in a recess in the clutch member $s$.

The outer clutch member also has a toothed rim $u$ with straight teeth. Opposite this rim a gear wheel $v$ is keyed on the counter-shaft, and adapted to be brought into indirect engagement with the rim $u$ or with the change clutch member $s$ constructed as gear wheel by a slidable gear wheel $w$ which is mounted in the usual manner on another shaft, not shown in the drawing.

As shown in Fig. 1, a change clutch comprising the two separate clutch members $x$ and $y$ is arranged in a suitable manner between the gear wheels $g_2$ and $h_2$. However, in this instance the outer change clutch member $y$ is provided with a groove $z$ for a control fork instead of with a toothed rim.

For changing the gear, the lever 10 shifts a selector plate 11 provided with balls 12 and stops 13, and this plate shifts the three control rods 14, 15 and 16 in some manner or other which is not of particular interest here. A fork 17 is connected with the control rod 14, straddles the change clutch member $s$ and serves for shifting this member in a manner which will be hereinafter described in detail. A fork 18 is connected with the rod 15 and engages in the groove $z$ of the change clutch member $y$. Finally a lever 20 pivoted at 19 is actuated by the rod 16, and is provided with arms acting in any suitable manner upon the slidable gear wheel w to shift it into simultaneous engagement with the gear wheels u and v.

For locking the change rods so that only one can be shifted out of its neutral intermediate position, two balls 21 and 22 are provided in known manner, these balls engaging in corresponding recesses in the neighbouring rods, and they are held at a predetermined distance apart by a pin 23 fixed in the middle rod. The balls 24 engaging in the recesses in the change rods under spring action serve in known manner for determining the individual change positions.

Figures 3, 4:
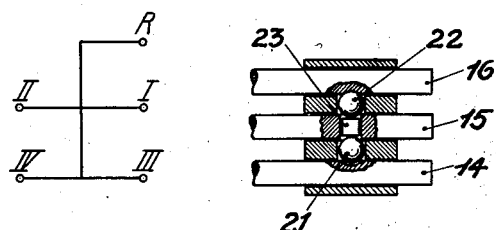
Fig. 3 shows a schematic diagram of the path followed by the control lever.
Fig. 4 shows the locking device for the change rods.

The gear operates in the following manner:

The positions of the lever 10 for engaging the different speeds are illustrated diagrammatically in Fig. 3. For engaging the first speed the lever 10, and through the intermediary of the right abutment 13 the control rod 14, are shifted towards the right. The fork 17 shifts also towards the right the outer clutch member s constructed as gear wheel u and, through the intermediary of the balls t, likewise the inner change clutch member o. Thus the conical friction surface q is first pressed against the corresponding friction surface m of the gear wheel $f_1$ so that this gear wheel connected with the shaft b through the intermediary of the gear wheels $e_1$, $e_2$, $f_2$ rotates in the same direction as the shaft d. Under a slightly increased changing pressure the ball t is pressed aside, so that the outer clutch member s is uncoupled from the inner clutch member o and its inner grooves $r_1$ can be brought into engagement with the claws 1. The first speed is then produced by the gear elements b—$e_1$—$e_2$—c—$f_2$—$f_1$—s—o—d.

In a similar manner the second gear is engaged by shifting towards the left the control rod 15 and consequently the change clutch x, y, so that the pair of gear wheels $g_2$, $g_1$ become operative. The third speed is obtained by shifting towards the right the control rod 15 with the result that the pair of gear wheels $h_2$, $h_1$ are engaged in a corresponding manner. In the fourth, direct gear the shafts b and d are coupled by means of the claw members i, $r_1$ after previous synchronization by the conical surfaces p, k, in that the lever 10, through the intermediary of the stop 13 arranged on the selector plate 11, shifts towards the left the control rod 14 with the fork 17 and consequently the clutch member 17.

The stops 13 are arranged in such a manner that they move the control rod 14 in the first and fourth speeds and the control rod 15 in the second and third speeds. The balls 12 serve for allowing the control rods to be shifted out of their medium position by the corresponding stops only during the changing stroke for one speed. It is possible, by this known change-speed method, to arrange inwards the gear wheels $f_1$, $f_2$ for the first speed, and the gear wheels $h_1$, $h_2$ for the third speed outwards near the case wall so that the gear runs very quietly in the third speed.

For engaging the reverse speed the control rod 16 is shifted towards the right by means of the right stop 13, and thus brings the gear wheel w into mesh with the gear wheels u and v. The locking device 22—23—21 in this instance locks the control rod and consequently the change clutch member constructed as a gear wheel u in its neutral middle position.

As shown in the drawing extra space is not required for the reverse speed when the clutch member s is constructed as gear wheel u so that the gear is kept as short and light as possible.

I claim:

1. In a variable speed transmission, a driving shaft, a counter-shaft geared thereto, a driven shaft, a plurality of continuously respectively engaging gear wheels on said counter-shaft and driven shaft, a pair of synchronizing clutches respectively rotatable with said driven shaft and said counter-shaft to provide at least three noiseless forward speeds, one of said clutches having an annular rim of gear teeth, a fourth shaft, and a gear wheel on said fourth shaft shiftable to interconnect said driven shaft and said counter-shaft through said toothed clutch to provide a reverse drive for said transmission.

2. The combination according to claim 1, in which the continuously engaging gear wheels are formed with oblique teeth and said clutch and reverse gear with straight teeth.

3. The combination according to claim 1, in which the toothed clutch is drivably connected with the driven shaft.

4. In a variable speed transmission, a driving shaft, a counter-shaft geared thereto, a driven shaft, a gear wheel and a first synchronizing clutch drivably connected to said driven shaft, a gear wheel rotatably mounted on said driven shaft, said clutch being shiftable between said driving shaft and said rotatably mounted gear wheel to respectively provide high and low forward transmission speeds, a gear wheel and a second synchronizing clutch drivably connected with said counter-shaft, said gear wheel being in continuous engagement with the rotatably mounted gear wheel on said driven shaft, a gear wheel rotatably mounted on said counter-shaft in continuous engagement with the gear wheel drivably connected with said driven shaft, said second synchronizing clutch being shiftable to engage said rotatably mounted gear wheel on said counter-shaft to provide an intermediate forward transmission speed, an annular rim of gear teeth on one of said clutches, a fourth shaft, and a gear wheel on said fourth shaft shiftable to interconnect said driven shaft and said counter-shaft through said toothed clutch to provide a reverse drive for said transmission.

5. The combination according to claim 4, in which the first clutch is the toothed clutch.

6. The combination according to claim 4, in which said driven shaft is provided with another gear wheel drivably connected thereto and said counter-shaft with another gear wheel continuously engaging said last gear wheel and rotatably mounted on the other side of said second clutch, said second clutch being also shiftable to engage the other rotatably mounted gear wheel to provide another intermediate forward transmission speed.

THEODOR KÜMMICH.